US008857193B2

(12) United States Patent
Thies

(10) Patent No.: US 8,857,193 B2
(45) Date of Patent: Oct. 14, 2014

(54) INTERMEDIATE CASING FOR A GAS-TURBINE ENGINE

(75) Inventor: Robert Thies, Schwielowsee (DE)

(73) Assignee: Rolls-Royce Deutschland Ltd & Co KG (DE)

(*) Notice: Subject to any disclaimer, the term of this patent is extended or adjusted under 35 U.S.C. 154(b) by 880 days.

(21) Appl. No.: 13/009,060

(22) Filed: Jan. 19, 2011

(65) Prior Publication Data

US 2011/0173990 A1   Jul. 21, 2011

(30) Foreign Application Priority Data

Jan. 20, 2010  (DE) .................. 10 2010 001 059

(51) Int. Cl.
*F02C 7/20* (2006.01)
*F02C 7/32* (2006.01)
*F01D 25/28* (2006.01)
*F01D 25/34* (2006.01)
*F01D 25/16* (2006.01)
*F02C 7/275* (2006.01)

(52) U.S. Cl.
CPC ............... *F01D 25/28* (2013.01); *F01D 25/34* (2013.01); *Y02T 50/671* (2013.01); *F01D 25/162* (2013.01); *F02C 7/20* (2013.01); *F02C 7/32* (2013.01); *F02C 7/275* (2013.01)
USPC ................ 60/797; 60/802; 60/226.1; 244/54

(58) Field of Classification Search
CPC ............. F02C 7/20; F02C 7/275; F02C 7/32; F01D 25/28; B64D 27/10; B64D 27/14
USPC ......... 60/796, 797, 226.1, 226.2, 802; 244/54
See application file for complete search history.

(56) References Cited

U.S. PATENT DOCUMENTS

| 2,494,821 | A |   | 1/1950 | Lombard |
| 2,803,943 | A | * | 8/1957 | Rainbow ................... 60/262 |
| 3,809,340 | A | * | 5/1974 | Dolgy et al. ................ 244/54 |

(Continued)

FOREIGN PATENT DOCUMENTS

| CH | 258674  | 12/1948 |
| DE | 1236867 | 3/1967  |

(Continued)

OTHER PUBLICATIONS

German Search Report dated Jan. 4, 2011 from counterpart German Application No. 10 2010 001 059.6.

*Primary Examiner* — Ted Kim
(74) *Attorney, Agent, or Firm* — Timothy J. Klima; Shuttleworth & Ingersoll, PLC

(57) ABSTRACT

An intermediate casing for a gas-turbine engine has an outer ring (3), an inner ring (1) and an intermediate ring (2) mutually supported by mutually aligned outer and inner supporting struts (4, 5). A radial drive shaft (6), positioned through inner and outer supporting struts (4.1, 5.1) aligned at a 6-o' clock position, connects to an auxiliary gear drive (7). Four additional outer supporting struts (5.2, 5.3, 5.4, 5.5) are spaced apart 72°. A mounting bracket connects to the outer ring at a side facing an aircraft fuselage in areas of two of the additional outer supporting struts. The arrangement of supporting struts and type of mounting bracket attachment, saves weight, improves flow in the bypass duct and increase maintenance and installation access at the bottom side of the engine to nearly 144°.

13 Claims, 1 Drawing Sheet

(56) References Cited

U.S. PATENT DOCUMENTS

| | | | |
|---|---|---|---|
| 3,907,386 A * | 9/1975 | Kasmarik et al. | 384/559 |
| 4,044,973 A * | 8/1977 | Moorehead | 60/787 |
| 4,326,682 A * | 4/1982 | Nightingale | 60/226.1 |
| 5,080,555 A * | 1/1992 | Kempinger | 60/39.08 |
| 5,148,673 A | 9/1992 | Enderle | |
| 5,272,869 A | 12/1993 | Dawson et al. | |
| 5,443,229 A * | 8/1995 | O'Brien et al. | 60/797 |
| 6,622,475 B2 | 9/2003 | Brault et al. | |
| 7,266,941 B2 * | 9/2007 | Eleftheriou et al. | 60/796 |
| 7,673,461 B2 | 3/2010 | Cameriano et al. | |
| 7,815,145 B2 * | 10/2010 | Beardsley | 60/796 |
| 2006/0000944 A1 * | 1/2006 | Dron | 244/54 |
| 2006/0248900 A1 | 11/2006 | Suciu et al. | |
| 2008/0105782 A1 * | 5/2008 | Beardsley | 244/54 |
| 2009/0114766 A1 * | 5/2009 | Sjunnesson et al. | 244/54 |

FOREIGN PATENT DOCUMENTS

| | | |
|---|---|---|
| DE | 3935313 | 6/1991 |
| DE | 10116535 | 2/2002 |
| DE | 60220737 | 3/2008 |
| EP | 0298014 | 1/1989 |
| EP | 1770246 | 4/2007 |
| GB | 623615 | 5/1949 |
| GB | 1428091 | 3/1976 |
| WO | 2005012696 | 2/2005 |
| WO | 2005119028 | 12/2005 |
| WO | 2008060195 | 5/2008 |
| WO | 2009108084 | 9/2009 |

* cited by examiner

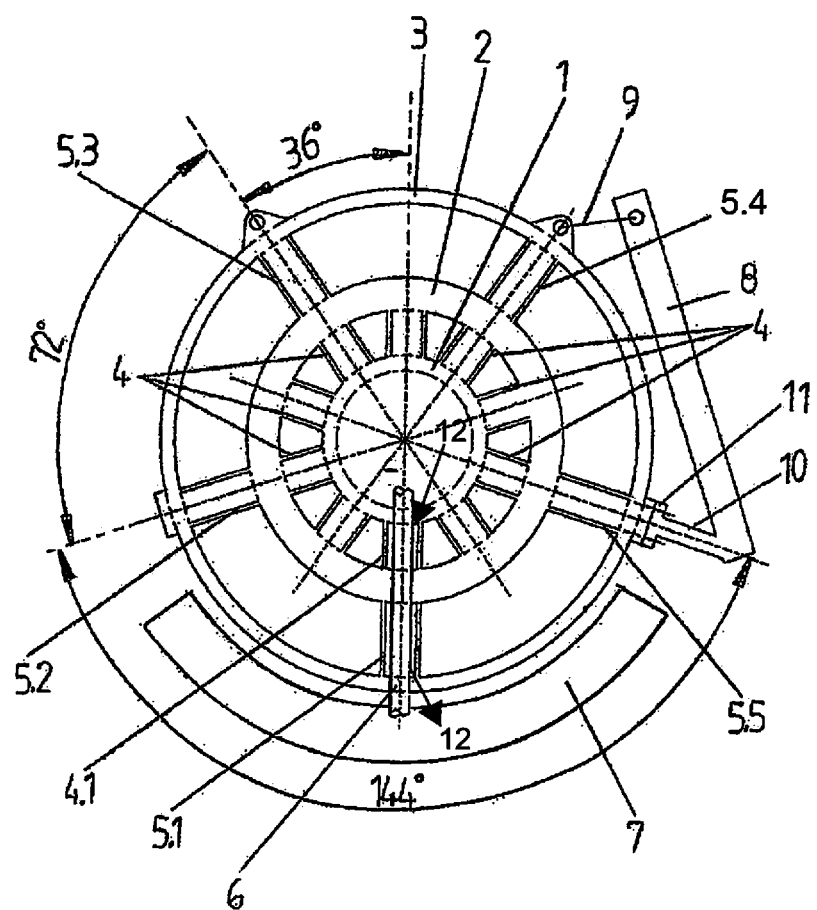

INTERMEDIATE CASING FOR A GAS-TURBINE ENGINE

This application claims priority to German Patent Application DE102010001059.6 filed Jan. 20, 2010, the entirety of which is incorporated by reference herein.

This invention relates to an intermediate casing for a gas-turbine engine which has an outer ring, an inner ring and an intermediate ring mutually supported by mutually aligned outer and inner supporting struts and which is associated with a mounting bracket for fitting the engine at the right or left-hand side of an aircraft fuselage.

A known gas-turbine engine has an intermediate casing (or front casing) including an outer ring, an inner ring and an intermediate ring connected for mutual support and reinforcement by inner supporting struts (or core duct struts) arranged between the inner ring and the intermediate ring as well as outer supporting struts (or bypass duct struts) arranged between the intermediate ring and the outer ring. For example, ten mutually aligned inner and outer supporting struts are arranged at an angle of 36° each. Besides reinforcement, individual supporting struts also serve for aerodynamic fairing. The three sideward supporting struts provided in each of the two opposite sideward areas of the intermediate casing are additionally required in conjunction with the safe attachment of a fastening or mounting bracket by which the engine is fitted at the left or right-hand side of the aircraft fuselage, respectively. The middle one (3-o' clock and 9-o' clock position) of these three supporting struts each provides for the accommodation of a supporting spigot connected to the mounting bracket, while articulated eyes are provided on the outer ring at the level of the two adjacent supporting struts for articulated connection with the mounting bracket. The two upper—inner and outer—supporting struts and one lower—inner and outer—supporting strut also serve for the routing (aerodynamic fairing) of service lines, and with the remaining—inner and outer—lower supporting strut a radial drive shaft is aerodynamically faired which is connected to an auxiliary gear drive arranged beneath the engine. The configuration of the intermediate casing described above is disadvantageous in that, due to the arrangement and use of the outer supporting struts, only limited space for accommodating the auxiliary gear drive or other equipment is available at the bottom side of the intermediate casing. In addition, the multitude of supporting struts affects the aerodynamics of the engine bypass duct flow and increases engine weight.

A broad aspect of the present invention is to provide the intermediate casing of a gas-turbine engine such that blockage of the flow in the bypass duct and engine weight are reduced while ensuring more space for the arrangement of the accessory gear drive and other auxiliaries, as well as improved access to the engine for repair and maintenance.

On the basis of an intermediate casing for a gas-turbine engine which has an outer ring, an inner ring and an intermediate ring mutually supported by mutually aligned outer and inner supporting struts and which is associated with a mounting bracket for fitting the engine each at a side facing an aircraft fuselage as well as—at the bottom side—an auxiliary gear drive connected to a radial drive shaft, the present invention, in essence, provides that an inner and an outer supporting strut fairing the radial drive shaft are each arranged in 6-o' clock position and only four further—sidewardly positioned—outer supporting struts are circumferentially equiangularly disposed between the outer ring and the intermediate ring at an angular distance of 72°, thereby providing a comfortable installation and access area of 144° at the bottom side of the engine for arranging accessories and performing maintenance and installation work. The mounting bracket associated with the intermediate ring at the right or left-hand side is, in the area of the two sideward—right-hand or left-hand—supporting struts, fixed to the outer side of the outer ring by an articulated joint and a supporting spigot firmly fitted to the outer ring and formed on the mounting bracket. As a result of the specific arrangement of the supporting struts in combination with the type of attachment of the mounting bracket, saving of weight and improved flow in the bypass duct of the engine is achieved—besides improved maintenance and installation access at the bottom side of the engine.

In a further embodiment of the present invention, the inner supporting struts are arranged at an angular distance of 36°. The supporting spigot is attached to the outer ring by a flange and a bolt.

In a further embodiment of the present invention, the oil scavenge routing is accomplished from a rear face of the intermediate ring beneath a core fairing through a splitter fairing or also through the supporting strut fairing the radial drive shaft.

In another embodiment of the present invention, both air ducting and routing of the speed sensor cabling are accomplished from the rear face of the intermediate ring beneath the core fairing via the splitter fairing and an accelerometer is installed near the outer supporting struts in an area of the articulated joint.

An embodiment of the present invention is more fully described in light of the attached FIGURE.

FIG. 1 shows a schematic sectional view of an intermediate casing, which is associated with a mounting bracket for fitting an engine and an auxiliary gear drive.

The intermediate casing includes an inner ring 1, an intermediate ring 2 and an outer ring 3, which are mutually supported by inner supporting struts 4 and outer supporting struts 5. Between the inner ring 1 and the intermediate ring 2, a total of ten inner supporting struts 4 are each situated at an angle of 36°, with one inner supporting strut 4.1 being in each case disposed in 6-o' clock position. The outer supporting struts 5 are arranged between the outer ring 3 and the intermediate ring 2, with one outer supporting strut 5.1 being disposed in 6-o' clock position and, accordingly, in alignment with the inner supporting strut 4.1. The supporting struts 4.1 and 5.1 disposed in the 6-o' clock position are each provided as hollow bodies aerodynamically fairing a radial drive shaft 6. The radial drive shaft 6 engages an accessory gear drive 7 arranged at the bottom side of the engine. Arranged offset at an angle of 72° relative to each other and to the first inner and outer supporting struts 4.1 and 5.1 are four further outer supporting struts 5.2 to 5.5 which are in alignment with the correspondingly arranged inner supporting struts, i.e. with each second inner supporting strut 4. As a result of the reduction and the type of arrangement of the outer supporting struts 5, sufficient space is available at the bottom side of the engine in an area of approximately or nearly 144° (less clearance for mounting structure) for installing the accessory gear drive 7 and further auxiliaries, effectively enabling tubing and cabling lengths and, ultimately, weight to be reduced and, furthermore, servicing and maintenance access from the ground to be improved. Such geometry is preferred but other geometries can also be used.

The specific disposition and reduction of the outer supporting struts 5.1 to 5.5 is achieved by a changed mounting arrangement of the engine via the mounting bracket 8 arranged at the right-hand or, respectively, left-hand side of the intermediate casing and installable with only two supporting struts each. The mounting bracket 8 is held on the outer ring 3 at the level of the two sideward supporting struts, whether the two right-hand supporting struts 5.4 and 5.5 or the two left-hand supporting struts 5.2 and 5.3, at only two positions each At one end, at the level of the outer supporting strut 5.3 or 5.4, respectively, the mounting bracket 8 is held by an articulated joint 9 and, at the other end, at the level of the outer supporting strut 5.2 or 5.5, respectively, the mounting bracket 8 is held a supporting spigot 10 formed on the mounting bracket 8 and firmly connected to the outer ring 3 at the level of the supporting strut 5.2 or 5.5, respectively. Attachment of the supporting spigot 10 to the intermediate casing is here accomplished by a flanged connection 11 with a bolt, although other attachment mechanisms can also be used.

Oil scavenge routing (see arrows 12) may be accomplished from the rear face of the intermediate ring 2 beneath the core fairing through the splitter fairing or also through the supporting strut 5.1 fairing the radial drive shaft 6, thereby making dispensable an outer supporting strut normally provided for this purpose.

Both air ducting and routing of the speed sensor cabling are accomplished from the rear face of the intermediate ring beneath the core fairing via the splitter fairing. The accelerometer can be installed near the outer supporting struts 5.3 or 5.4, i.e. where the articulated joint 9 is attached.

Besides improving the amount of space at the bottom side of the engine, the proposed configuration of the intermediate casing is advantageous in that the reduced number of supporting struts improves airflow in the bypass duct while saving engine weight.

LIST OF REFERENCE NUMERALS

1 Inner ring
2 Intermediate ring
3 Outer ring
4 Inner supporting struts
4.1 Inner supporting strut in 6-o' clock position
5 Outer supporting struts
5.1 Outer supporting strut in 6-o' clock position
5.2, 5.3 Outer supporting struts (left-hand side)
5.4, 5.5 Outer supporting struts (right-hand side)
6 Radial drive shaft
7 Accessory gear drive
8 Mounting bracket
9 Articulated joint
10 Supporting spigot
11 Flanged connection

What is claimed is:

1. An intermediate casing for a gas-turbine engine, comprising:
    an outer ring;
    an inner ring;
    an intermediate ring;
    a plurality of outer supporting struts connecting the outer ring to the intermediate ring;
    a plurality of inner supporting struts connecting the inner ring to the intermediate ring; a bottom one of the outer supporting struts and a bottom one of the inner supporting struts being hollow and aligned with respect to each other to form a passageway extending therethrough; a first further pair and a second further pair of outer supporting struts being spaced apart from one another and the bottom one of the outer supporting struts, the first further pair and the second further pair of outer supporting struts being positioned on respective first and second sides of the intermediate casing;
    a mounting bracket for fitting the engine at a respective one of the first and second sides of the intermediate casing facing an aircraft fuselage to which the engine is attached;
    a radial drive shaft positioned within the passageway formed by the bottom one of the outer supporting struts and the bottom one of the inner supporting struts to be aerodynamically faired by both bottom supporting struts;
    an auxiliary gear drive positioned at a bottom side and radially outward of the outer ring and connected to the radial drive shaft;
    an articulated joint connecting a first end of the mounting bracket to a radially outer side of the outer ring in an area of one of the respective pair of outer supporting struts positioned at the respective one of the first and second sides of the intermediate casing facing the aircraft fuselage;
    a supporting spigot positioned at a second end of the mounting bracket for connecting the second end of the mounting bracket to a radially outer side of the outer ring in an area of another of the respective pair of outer supporting struts positioned at the respective one of the first and second sides of the intermediate casing facing the aircraft fuselage, the supporting spigot extending radially inwardly to be generally aligned with the other of the respective pair of outer supporting struts positioned at the respective one of the first and second sides of the intermediate casing facing the aircraft fuselage;
    wherein the supporting spigot includes a flange having an engagement face engaging a radially outer end face of the other of the respective pair of outer supporting struts positioned at the respective one of the first and second sides of the intermediate casing facing the aircraft fuselage for establishing a flanged connection attaching the supporting spigot to the outer ring;
    at least one threaded fastener securing together the flanged connection.

2. The intermediate casing of claim 1, wherein, all of the outer support struts are circumferentially equiangularly disposed between the outer ring and the intermediate ring and the bottom inner and bottom outer supporting struts are each positioned at a 6-o' clock position on the intermediate casing.

3. The intermediate casing of claim 2, comprising:
    ten inner supporting struts arranged at an angular distance of 36° with respect to each other; and
    five outer supporting struts arranged at an angular distance of 72° with respect to each other and aligned with alternating ones of the inner supporting struts, with a space at the bottom of the intermediate ring available positioning the accessory gear drive and other auxiliaries being nearly 144°.

4. The intermediate casing of claim 3, wherein the supporting spigot is formed on the mounting bracket.

5. The intermediate casing of claim 4, wherein oil scavenge routing is provided from a rear face of the intermediate ring through the supporting struts fairing the radial drive shaft.

6. The intermediate casing of claim 1, comprising:
    ten inner supporting struts arranged at an angular distance of 36° with respect to each other; and
    five outer supporting struts arranged at an angular distance of 72° with respect to each other and aligned with alternating ones of the inner supporting struts, with a space at the bottom of the intermediate ring available positioning the accessory gear drive and other auxiliaries being nearly 144°.

7. The intermediate casing of claim 6, wherein the supporting spigot is formed on the mounting bracket.

8. The intermediate casing of claim 7, wherein oil scavenge routing is provided from a rear face of the intermediate ring through the supporting struts fairing the radial drive shaft.

9. The intermediate casing of claim 7, wherein the supporting spigot is formed on the mounting bracket.

10. The intermediate casing of claim 9, wherein oil scavenge routing is provided from a rear face of the intermediate ring through the supporting struts fairing the radial drive shaft.

11. The intermediate casing of claim 1, wherein the supporting spigot is formed on the mounting bracket.

12. The intermediate casing of claim 11, wherein oil scavenge routing is provided from a rear face of the intermediate ring through the supporting struts fairing the radial drive shaft.

13. The intermediate casing of claim 1, wherein oil scavenge routing is provided from a rear face of the intermediate ring through the supporting struts fairing the radial drive shaft.

* * * * *